United States Patent
Ito et al.

(10) Patent No.: US 10,962,254 B2
(45) Date of Patent: Mar. 30, 2021

(54) VENTILATION DEVICE

(71) Applicant: Mitsubishi Electric Corporation, Tokyo (JP)

(72) Inventors: Kazuhiro Ito, Tokyo (JP); Shigeo Takata, Tokyo (JP); Jun Someya, Tokyo (JP); Koji Rikukawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 398 days.

(21) Appl. No.: 15/739,554

(22) PCT Filed: Aug. 31, 2015

(86) PCT No.: PCT/JP2015/074572
§ 371 (c)(1),
(2) Date: Apr. 2, 2018

(87) PCT Pub. No.: WO2017/037816
PCT Pub. Date: Mar. 9, 2017

(65) Prior Publication Data
US 2018/0306462 A1    Oct. 25, 2018

(51) Int. Cl.
*F24F 13/30*  (2006.01)
*F24F 7/08*   (2006.01)
(Continued)

(52) U.S. Cl.
CPC .............. *F24F 13/30* (2013.01); *F24F 7/08* (2013.01); *F24F 11/67* (2018.01); *F24F 11/84* (2018.01);
(Continued)

(58) Field of Classification Search
CPC .. F24F 13/30; F24F 11/86; F24F 11/76; F24F 11/84; F24F 12/006; F24F 12/00;
(Continued)

(56) References Cited

U.S. PATENT DOCUMENTS 6,131,653 A  * 10/2000 Larsson ............... F24F 3/14
                                                165/224
6,199,394 B1 *  3/2001 Maeda ................ F24F 3/1423
                                                 62/271
(Continued)

FOREIGN PATENT DOCUMENTS

JP   2003-083629 A    3/2003
JP   2009-281707 A   12/2009
(Continued)

OTHER PUBLICATIONS

International Search Report dated Nov. 24, 2015 issued in corresponding International Patent Application No. PCT/JP2015/074572.
(Continued)

*Primary Examiner* — Kun Kai Ma
(74) *Attorney, Agent, or Firm* — Posz Law Group, PLC

(57) ABSTRACT

A ventilation device includes an outside air heat exchanger disposed between a total heat exchanger and an outside air port, a return air heat exchanger disposed between the total heat exchanger and a return air port, and a supply air heat exchanger disposed between the total heat exchanger and a supply air port. A compressor, a flow switching device, the outside air heat exchanger, an outside air expansion device, and the return air heat exchanger are sequentially connected by pipes, the supply air heat exchanger and a supply air expansion device which are connected in series by pipes are connected in parallel to the outside air heat exchanger and the outside air expansion device by pipes, thereby forming a refrigerant circuit in which refrigerant is circulated.

6 Claims, 8 Drawing Sheets

(51) Int. Cl.
*F24F 11/86* (2018.01)
*F24F 11/67* (2018.01)
*F24F 11/84* (2018.01)
*F24F 12/00* (2006.01)
*F24F 13/20* (2006.01)
*F24F 13/22* (2006.01)
*F24F 110/20* (2018.01)
*F24F 110/22* (2018.01)
*F24F 110/12* (2018.01)
*F24F 110/10* (2018.01)

(52) U.S. Cl.
CPC ............ *F24F 11/86* (2018.01); *F24F 12/003* (2013.01); *F24F 12/006* (2013.01); *F24F 13/20* (2013.01); *F24F 13/22* (2013.01); *F24F 2013/205* (2013.01); *F24F 2110/10* (2018.01); *F24F 2110/12* (2018.01); *F24F 2110/20* (2018.01); *F24F 2110/22* (2018.01)

(58) Field of Classification Search
CPC .......... F24F 12/003; F24F 13/02; F24F 13/22; F24F 7/08; F24F 2110/10; F24F 2110/12; F24F 2110/22; F24F 2110/20; F24F 13/205
See application file for complete search history.

(56) References Cited

U.S. PATENT DOCUMENTS

| | | | | |
|---|---|---|---|---|
| 6,543,698 | B1* | 4/2003 | Lyons | F24B 1/1808 126/512 |
| 2002/0164944 | A1* | 11/2002 | Haglid | F28D 5/00 454/228 |
| 2007/0051123 | A1* | 3/2007 | Matsui | F24F 3/1411 62/324.5 |
| 2007/0193287 | A1* | 8/2007 | Ishida | F25B 13/00 62/176.1 |
| 2008/0230206 | A1* | 9/2008 | Lestage | F24F 3/147 165/48.1 |
| 2010/0286831 | A1* | 11/2010 | Boudreau | F24F 12/006 700/278 |
| 2011/0079024 | A1* | 4/2011 | Hakbijl | F24F 12/003 62/56 |
| 2011/0308265 | A1* | 12/2011 | Phannavong | F24F 12/001 62/160 |
| 2013/0092345 | A1* | 4/2013 | McKie | B23P 15/26 165/7 |
| 2014/0069134 | A1* | 3/2014 | Grabon | F24F 3/1405 62/305 |
| 2014/0190037 | A1* | 7/2014 | Erb | F24F 3/147 34/474 |
| 2014/0260362 | A1* | 9/2014 | Jung | F28D 9/0031 62/80 |
| 2014/0264968 | A1* | 9/2014 | Erb | F28D 21/0008 261/100 |
| 2014/0273799 | A1* | 9/2014 | Erb | A62C 2/065 454/257 |
| 2016/0106008 | A1* | 4/2016 | Cotton | F24F 5/0007 165/248 |
| 2017/0003036 | A1* | 1/2017 | Andersson | F24F 12/001 |
| 2017/0097165 | A1* | 4/2017 | Yasuda | F24F 11/30 |
| 2020/0011549 | A1* | 1/2020 | Spargo | F25B 13/00 |

FOREIGN PATENT DOCUMENTS

JP 2012-032035 A 2/2012
JP 2012-184912 A 9/2012

OTHER PUBLICATIONS

Office Action dated Jan. 8, 2019 issued in corresponding JP patent application No. 2017-537082 (and English translation).

* cited by examiner

VENTILATION DEVICE

CROSS REFERENCE TO RELATED APPLICATION

This application is a U.S. national stage application of PCT/JP2015/074572 filed on Aug. 31, 2015, the contents of which are incorporated herein by reference.

TECHNICAL FIELD

The present invention relates to a ventilation device incorporating a total heat exchanger.

BACKGROUND ART

Heretofore, a ventilation device with an improved humidity exchange efficiency has been proposed (e.g., see Patent Literature 1).

In Patent Literature 1, a condenser is disposed at a downstream side of a supply air path of a total heat exchanger and an evaporator is disposed at an upstream side of an exhaust air path, and return air whose relative humidity is increased to about 90% by cooling of the evaporator is caused to flow into the total heat exchanger, thereby improving the humidity exchange efficiency in the total heat exchanger.

CITATION LIST

Patent Literature

Patent Literature 1: Japanese Unexamined Patent Application Publication No. 2009-281707

SUMMARY OF INVENTION

Technical Problem

Patent Literature 1 has a problem that only a case where outside air receives moisture from return air, such as an operation under winter conditions, is taken into consideration, and a case where the outside air supplies moisture to the return air, such as an operation under summer conditions, is not taken into consideration.

The present invention has been made in view of the above-mentioned problem, and an object of the present invention is to provide a ventilation device capable of improving the humidity exchange efficiency in a total heat exchanger when outside air receives moisture from return air, as well as when the outside air supplies moisture to the return air.

Solution to Problem

A ventilation device according to the present invention includes a casing, an inside of the casing being provided with: a supply air fan that suctions outdoor air from an outside air port; an exhaust air fan that suctions indoor air from a return air port; a total heat exchanger including a supply air passage and an exhaust air passage and configured to exchange heat between outdoor air passing through the supply air passage and indoor air passing through the exhaust air passage; a supply air path through which outdoor air suctioned by the supply air fan passes when the outside air passes through the supply air passage and is supplied into a room from a supply air port; an exhaust air path through which indoor air suctioned by the exhaust air fan passes when the indoor air passes through the exhaust air passage and is discharged to an outside of the room from an exhaust air port, the ventilation device including: an outside air heat exchanger disposed between the total heat exchanger and the outside air port; a return air heat exchanger disposed between the total heat exchanger and the return air port; and a supply air heat exchanger disposed between the total heat exchanger and the supply air port. A compressor, a flow switching device, the outside air heat exchanger, an outside air expansion device, and the return air heat exchanger are sequentially connected by pipes, the supply air heat exchanger and a supply air expansion device are connected in parallel to the outside air heat exchanger and the outside air expansion device by pipes to form a refrigerant circuit in which refrigerant is circulated, the supply air heat exchanger and the supply air expansion device being connected in series by pipes.

Advantageous Effects of Invention

In the ventilation device according to the present invention, a compressor, a flow switching device, the outside air heat exchanger, an outside air expansion device, and the return air heat exchanger are sequentially connected by pipes, and the supply air heat exchanger and a supply air expansion device, which are connected in series by pipes, are connected in parallel to the outside air heat exchanger and the outside air expansion device by pipes to form a refrigerant circuit in which refrigerant is circulated. Accordingly, the humidity exchange efficiency in the total heat exchanger can be improved when outside air receives moisture from return air, as well as when the outside air supplies moisture to the return air.

DESCRIPTION OF EMBODIMENTS

Figure 1:
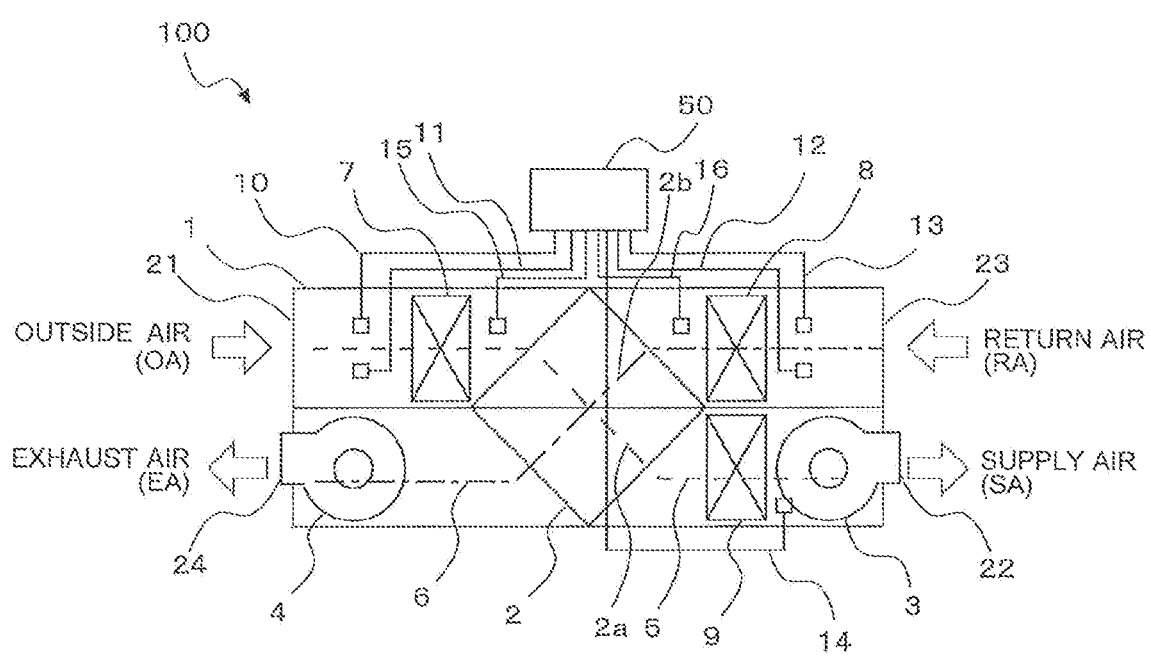
FIG. 1 is a cross-sectional view schematically illustrating a ventilation device according to Embodiment 1 of the present invention.

Embodiments of the present invention will be described below with reference to the drawings. Note that the present invention is not limited by the embodiments described below. In the drawings, the magnitude relationship between components may be different from the actual one.

Embodiment 1

FIG. 1 is a cross-sectional view schematically illustrating a ventilation device 100 according to Embodiment 1 of the present invention.

The ventilation device 100 is capable of taking air from the inside of a space to be air-conditioned, such as a house, a building, or a warehouse, to discharge the air to the outside of the space to be air-conditioned, and is also capable of taking air from the outside of the space to be air-conditioned to supply the air to the inside of the space to be air-conditioned. An example in which the space to be air-conditioned is a room of a house will be described below. Outdoor air (outside air: OA) corresponds to supply air (SA) supplied from the ventilation device 100 into the room, and indoor air (return air: RA) corresponds to exhaust air (EA) discharged from the ventilation device 100 to the outside of the room.

As illustrated in FIG. 1, the ventilation device 100 includes a supply air passage 2a and an exhaust air passage 2b. A total heat exchanger 2 that exchanges heat between outdoor air passing through the supply air passage 2a and indoor air passing through the exhaust air passage 2b is stored in a casing 1, which is formed in a rectangular parallelepiped box shape, and performs ventilation of the inside of the room while performing heat exchange and heat recovery by simultaneous air supply and exhaust.

The inside of the casing 1 of the ventilation device 100 is provided with a supply air path 5 through which outdoor air suctioned by the supply air fan 3 from an outside air port 21 passes when the outdoor air passes through the supply air passage 2a of the total heat exchanger 2 and is supplied into the room from a supply air port 22, and an exhaust air path 6 through which indoor air suctioned by the exhaust air fan 4 from a return air port 23 passes when the indoor air passes through the exhaust air passage 2b of the total heat exchanger 2 and is discharged to the outside of the room from an exhaust air port 24.

An outside air heat exchanger 7 is disposed on the supply air path 5 at am upstream side of the supply air passage 2a of the total heat exchanger 2, specifically, on the supply air path 5 between the total heat exchanger 2 and the outside air port 21, and a supply air heat exchanger 9 is disposed on the supply air path 5 at a downstream side of the supply air passage 2a of the total heat exchanger 2, specifically, on the supply air path 5 between the total heat exchanger 2 and the supply air port 22.

A return air heat exchanger 8 is disposed on the exhaust air path 6 at the upstream side of the exhaust air passage 2b of the total heat exchanger 2, specifically, on the exhaust air path 6 between the total heat exchanger 2 and the return air port 23.

An outside air temperature sensor 10 and an outside air humidity sensor 11 are disposed on the supply air path 5 at the upstream side of the outside air heat exchanger 7, specifically, on the supply air path 5 between the outside air heat exchanger 7 and the outside air port 21, and an outside air outlet temperature sensor 15 is disposed on the supply air path 5 at the downstream side of the outside air heat exchanger 7, specifically, on the supply air path 5 between the outside air heat exchanger 7 and the total heat exchanger 2.

A supply air temperature sensor 14 is disposed on the supply air path 5 at the downstream side of the supply air heat exchanger 9, specifically, on the supply air path 5 between the supply air heat exchanger 9 and the supply air port 22.

A return air temperature sensor 12 and a return air humidity sensor 13 are disposed on the exhaust air path 6 at the upstream side of the return air heat exchanger 8, specifically, on the exhaust air path 6 between the return air heat exchanger 8 and the return air port 23, and a return air outlet temperature sensor 16 is disposed on the exhaust air path 6 at the downstream side of the return air heat exchanger 8, specifically, on the exhaust air path 6 between the return air heat exchanger 8 and the total heat exchanger 2.

Figure 2:
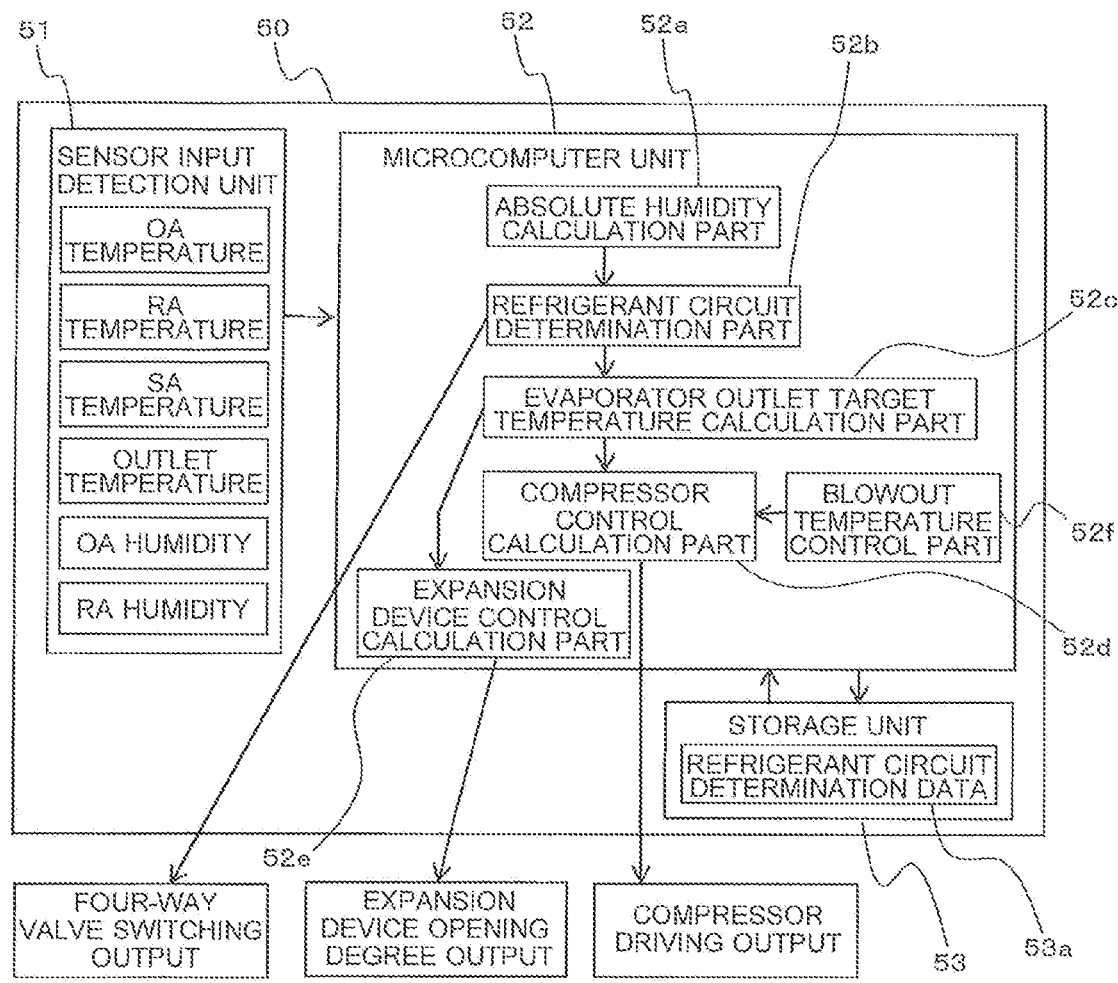
FIG. 2 is a functional block diagram illustrating a configuration of a controller of the ventilation device according to Embodiment 1 of the present invention.

FIG. 2 is a functional block diagram illustrating a configuration of a controller 50 of the ventilation device 100 according to Embodiment 1 of the present invention.

As illustrated in FIG. 2, the controller 50 includes a sensor input detection unit 51, a microcomputer unit 52, and a storage unit 53.

Detected values of the outside air temperature sensor 10, the outside air humidity sensor 11, the return air temperature sensor 12, the return air humidity sensor 13, the supply air temperature sensor 14, the outside air outlet temperature sensor 15, and the return air outlet temperature sensor 16 are input to the sensor input detection unit 51 of the controller 50. The sensor input detection unit 51 converts the detected values of each sensor into a temperature and humidity by A/D conversion or the like, and outputs the converted temperature and humidity information to the microcomputer unit 52.

The microcomputer unit 52 of the controller 50 acquires the temperature and humidity information from the sensor input detection unit 51, and performs control and the like of a four-way valve 18 and an expansion device, which is described below, based on the information.

Note that the microcomputer unit 52 includes an absolute humidity calculation part 52a, a refrigerant circuit determination part 52b, an evaporator outlet target temperature calculation part 52c, a compressor control calculation part 52d, an expansion device control calculation part 52e, and a blowout temperature control part 52f, which are described below.

The configuration of the controller 50 is not limited to the configuration described above. For example, some of the functions included in the microcomputer unit 52 may be provided outside the controller 50.

Figure 3A:
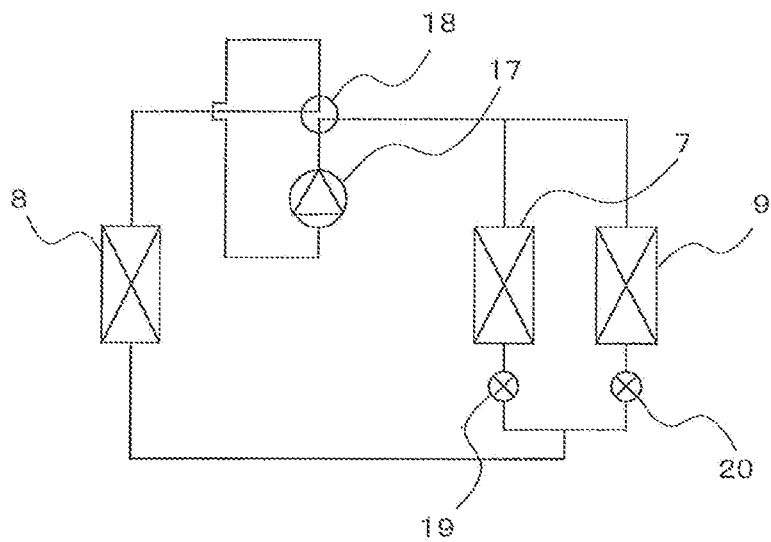
FIG. 3A illustrates a refrigerant circuit diagram illustrating a refrigerant circuit configuration in a refrigerant circuit A of the ventilation device according to Embodiment 1 of the present invention.
Figure 3B:
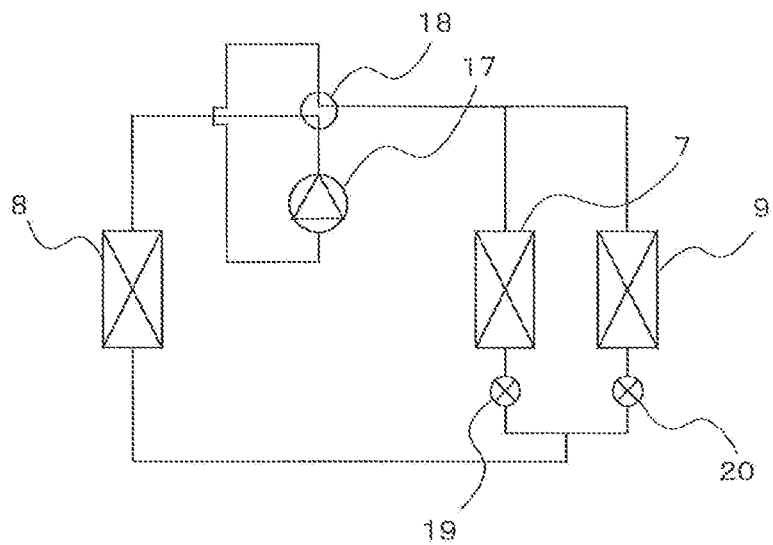
FIG. 3B illustrates a refrigerant circuit diagram illustrating a refrigerant circuit configuration in a refrigerant circuit B of the ventilation device according to Embodiment 1 of the present invention.

FIG. 3A illustrates a refrigerant circuit diagram illustrating a refrigerant circuit configuration in a refrigerant circuit A of the ventilation device 100 according to Embodiment 1 of the present invention. FIG. 3B illustrates a refrigerant circuit diagram illustrating a refrigerant circuit configuration in a refrigerant circuit B of the ventilation device 100 according to Embodiment 1 of the present invention.

As illustrated in FIGS. 3A and 3B, in the ventilation device 100 according to Embodiment 1, a compressor 17, the four-way valve 18, the outside air heat exchanger 7, an outside air expansion device 19, and the return air heat exchanger 8 are sequentially connected by pipes, and the supply air heat exchanger 9 and a supply air expansion device 20 which are connected in series by pipes are connected in parallel to the outside air heat exchanger 7 and the outside air expansion device 19 by pipes, thereby forming a refrigerant circuit in which refrigerant is circulated.

The four-way valve 18 is switched to change the direction in which the refrigerant is circulated, thereby enabling switching between the refrigerant circuit A illustrated in FIG. 3A and the refrigerant circuit B illustrated in FIG. 3B.

Note that the four-way valve 18 corresponds to a "flow switching device" of the present invention. While in Embodiment 1, the four-way valve 18 is used as the flow switching device, the four-way valve is not limited to this. For example, a two-way valve and a three-way valve may be used in combination.

Next, the control content of the ventilation device 100 according to Embodiment 1 will be described.

The ventilation device 100 is characterized in that a relative humidity of each of outside air and return air is controlled according to the absolute humidity of each of outside air and return air as shown in Table 1, to promote the transfer of humidity between the outside air flowing into the total heat exchanger 2 and the return air. Note that AHra represents the absolute humidity of the return air, and AHoa represents the absolute humidity of the outside air.

TABLE 1

| Absolute Humidity | Transfer of Humidity | Control Content |
|---|---|---|
| AHra > AHoa | RA → OA | Humidity exchange efficiency is increased by increasing OA relative humidity and reducing RA relative humidity |
| AHra = AHoa | None | None |
| AHra < AHoa | OA → RA | Humidity exchange efficiency is increased by increasing RA relative humidity and reducing OA relative humidity |

The transfer direction of humidity in the total heat exchanger 2 is determined depending on the level of the absolute humidity of each of the outside air and the return air. The transfer direction of humidity is from the air with a higher absolute humidity to the air with a lower absolute humidity. The humidity exchange efficiency in the total heat exchanger 2 is determined depending on the relative humidity between the opposing airs through a partition plate (not illustrated) in the total heat exchanger 2, and the humidity exchange efficiency increases as the difference in relative humidity increases.

Accordingly, the level of the absolute humidity of the outside air is compared with the level of the absolute humidity of the return air, thereby determining the refrigerant circuit, i.e., determining which one of the refrigerant circuit A and the refrigerant circuit B is better to use. The refrigerant circuit is switched to the one determined to be better to use, thereby improving the humidity exchange efficiency in the total heat exchanger 2 when the outside air receives moisture from the return air, as well as when the outside air supplies moisture to the return air. Further, the relative humidity of each of the outside air and the return air is controlled to improve at maximum the humidity exchange efficiency in the total heat exchanger 2.

Specifically, the absolute humidity calculation part 52a of the microcomputer unit 52 calculates AHoa, which represents the absolute humidity of the outside air, from the detected values of the outside air temperature sensor 10 and the outside air humidity sensor 11, and calculates AHra, which represents the absolute humidity of the return air, from the detected values of the return air temperature sensor 12 and the return air humidity sensor 13. The refrigerant circuit determination part 52b determines the refrigerant circuit based on the calculated outside air absolute humidity and return air absolute humidity by referring to refrigerant circuit determination data 53a which is stored in the storage unit 53 and illustrated in FIGS. 4 and 5 described below, and switches the four-way valve 18 based on the determination result.

When AHra−AHoa>0, or AHra>AHoa, the absolute humidity of the return air is higher than the absolute humidity of the outside air and the transfer direction of humidity is from the return air to the outside air. Accordingly, to promote the humidity exchange in the total heat exchanger 2, it is effective to increase the relative humidity by cooling the return air and to reduce the relative humidity by heating the outside air. Therefore, the refrigerant circuit A can further improve the humidity exchange efficiency.

On the other hand, when AHra−AHoa<0, or AHra<AHoa, the absolute humidity of the outside air is higher than the absolute humidity of the return air and the transfer direction of humidity is from the outside air to the return air. Accordingly, to promote the humidity exchange in the total heat exchanger 2, it is effective to increase the relative humidity by cooling the outside air and to reduce the relative humidity by heating the return air. Therefore, the refrigerant circuit B can further improve the humidity exchange efficiency.

Figure 4:
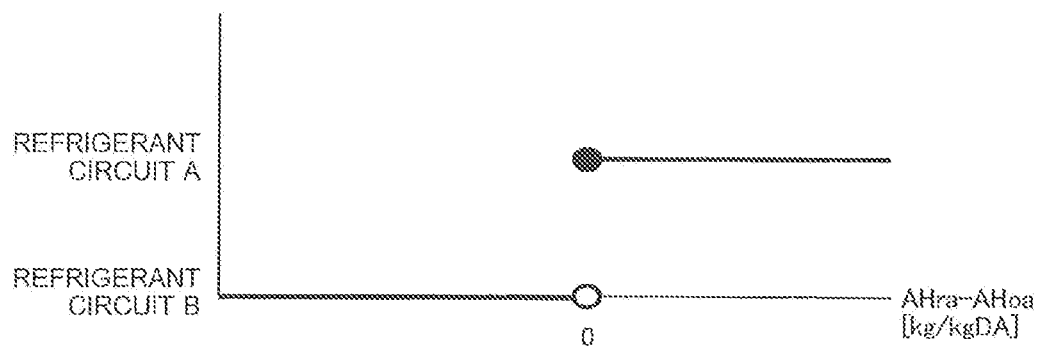
FIG. 4 is a first graph illustrating determination of a refrigerant circuit of the ventilation device according to Embodiment 1 of the present invention.
Figure 5:
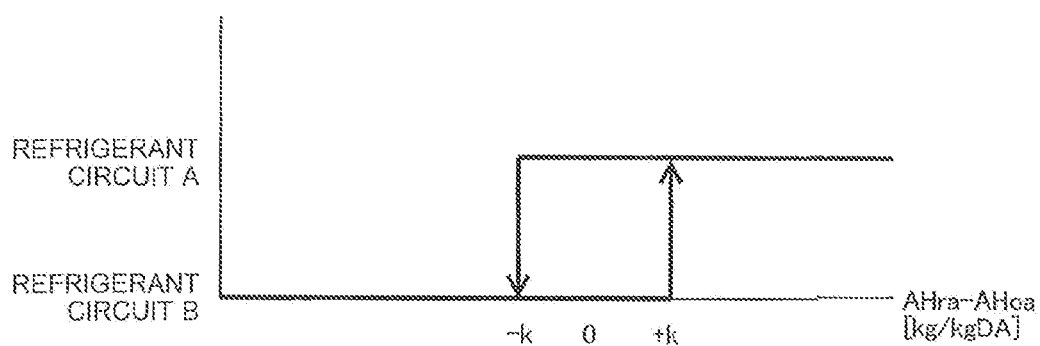
FIG. 5 is a second graph illustrating determination of a refrigerant circuit of the ventilation device according to Embodiment 1 of the present invention.

FIG. 4 is a first graph illustrating determination of the refrigerant circuit of the ventilation device 100 according to Embodiment 1 of the present invention. FIG. 5 is a second graph illustrating determination of the refrigerant circuit of the ventilation device 100 according to Embodiment 1 of the present invention.

Thus, as illustrated in FIG. 4, when AHra−AHoa>0, the microcomputer unit 52 switches the four-way valve 18 to thereby select the refrigerant circuit A, and when AHra−AHoa<0, the microcomputer unit 52 switches the four-way valve 18 to thereby select the refrigerant circuit B. Note that when AHra−AHoa=0, or AHra=AHoa, there is no humidity transfer and thus the four-way valve 18 is not switched.

Note that the determination of the refrigerant circuit is performed, for example, every certain period. The period for the determination may be adjusted in consideration of hunting in the vicinity of AHra−AHoa=0. Similarly, in consideration of hunting, as illustrated in FIG. 4, the four-way valve 18 may not be switched in a range (−k to +k: k is a constant) in which it can be regarded that there is almost no humidity transfer in the total heat exchanger 2 in the vicinity of AHra−AHoa=0.

After the determination of the refrigerant circuit, the compressor control calculation part 52d of the microcomputer unit 52 controls driving of the compressor 17 in such a manner that an evaporator outlet temperature detected by the outside air outlet temperature sensor 15 or the return air outlet temperature sensor 16 reaches a preset evaporator outlet target temperature. The evaporator outlet target temperature is set to a target value of, for example, a relative humidity of 90%, at which condensation is not generated in the total heat exchanger 2. The evaporator outlet target temperature is obtained by the evaporator outlet target temperature calculation part 52c of the microcomputer unit 52 by using, for example, a relative-humidity-to-evaporator-outlet-target-temperature conversion table (not illustrated) stored in the storage unit 53.

In the case of the refrigerant circuit A illustrated in FIG. 3A, the return air heat exchanger 8 functions as an evaporator and the outside air heat exchanger 7 and the supply air heat exchanger 9 function as a condenser. Accordingly, the return air heat exchanger 8 may cool the air to the vicinity of the relative humidity of 90%, and the outside air heat exchanger 7 may heat the air by an amount equal to the amount of air cooled by the return air heat exchanger 8.

Figure 6:
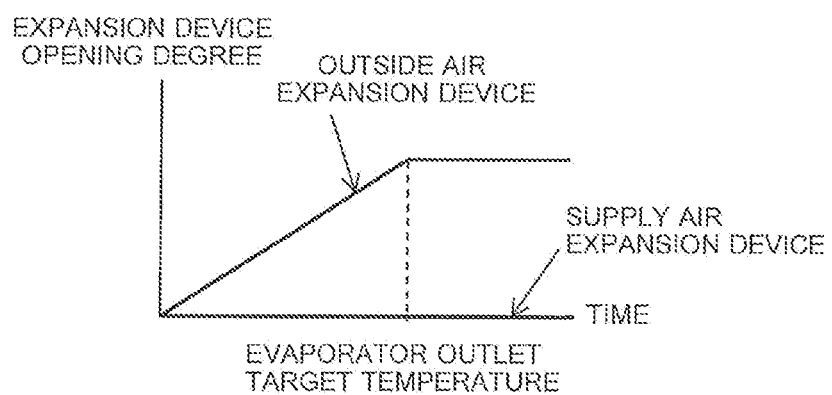
FIG. 6 is a first graph illustrating opening and closing control of a supply air expansion device and an outside air expansion device in the case of the refrigerant circuit A of the ventilation device according to Embodiment 1 of the present invention.

FIG. 6 is a first graph illustrating opening and closing control of the supply air expansion device 20 and the outside air expansion device 19 in the case of the refrigerant circuit A of the ventilation device 100 according to Embodiment 1 of the present invention.

The compressor control calculation part 52d of the microcomputer unit 52 controls driving of the compressor 17 in such a manner that the evaporator outlet temperature detected by the return air outlet temperature sensor 16, i.e., the outlet temperature of the return air heat exchanger 8, reaches the preset evaporator outlet target temperature, and at the same time, the expansion device control calculation part 52e of the microcomputer unit 52 controls the opening degree of the outside air expansion device 19. Specifically, as illustrated in FIG. 6, the opening degree of the outside air expansion device 19 is gradually increased, and when the evaporator outlet temperature reaches the evaporator outlet target temperature, the opening degree is fixed. Note that the supply air expansion device 20 remains fully closed.

In the above-described case, the supply air expansion device 20 remains fully closed. However, for example, when the outside air has a low temperature of 5 degrees C. and a low humidity of 40%, i.e., when the outside air temperature detected by the outside air temperature sensor 10 is equal to or less than a preset temperature and the outside air humidity detected by the outside air humidity sensor 11 is equal to or less than a preset humidity, the amount of decrease in the relative humidity corresponding to a temperature rise is reduced, which makes it difficult to improve the humidity exchange efficiency in the total heat exchanger 2.

Accordingly, the blowout temperature control part 52f of the microcomputer unit 52 may preferentially control the blowout temperature in the supply air heat exchanger 9, or ensure the supply air temperature, and the amount of extra heat may be used for heating in the outside air heat exchanger 7.

Figure 7:
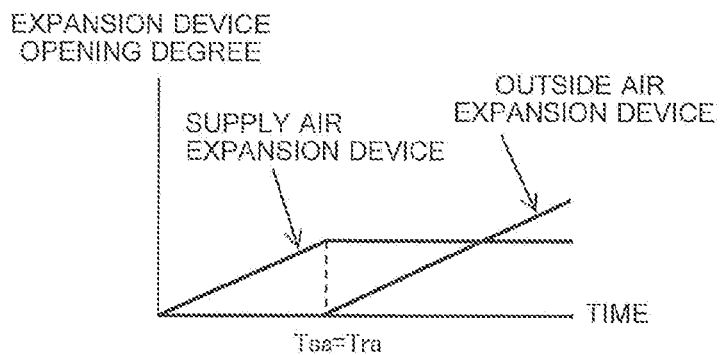
FIG. 7 is a second graph illustrating opening and closing control of the supply air expansion device and the outside air expansion device in the case of the refrigerant circuit A of the ventilation device according to Embodiment 1 of the present invention.

FIG. 7 is a second graph illustrating opening and closing control of the supply air expansion device 20 and the outside air expansion device 19 in the case of the refrigerant circuit A of the ventilation device 100 according to Embodiment 1 of the present invention.

Specifically, when the outside air temperature is equal to or less than the preset temperature and the outside air humidity is equal to or less than the preset humidity, and when a supply air temperature Tsa<a return air temperature Tra, as illustrated in FIG. 7, the opening degree of the supply air expansion device 20 is gradually increased until the supply air temperature Tsa becomes equal to the return air temperature Tra. When the supply air temperature Tsa becomes equal to the return air temperature Tra, the opening degree of the supply air expansion device 20 is fixed and the opening degree of the outside air expansion device 19 is gradually increased. The subsequent process is similar to that illustrated in FIG. 6 described above.

Note that the supply air temperature Tsa is detected by the supply air temperature sensor 14, and the return air temperature Tra is detected by the return air temperature sensor 12.

Figure 8:
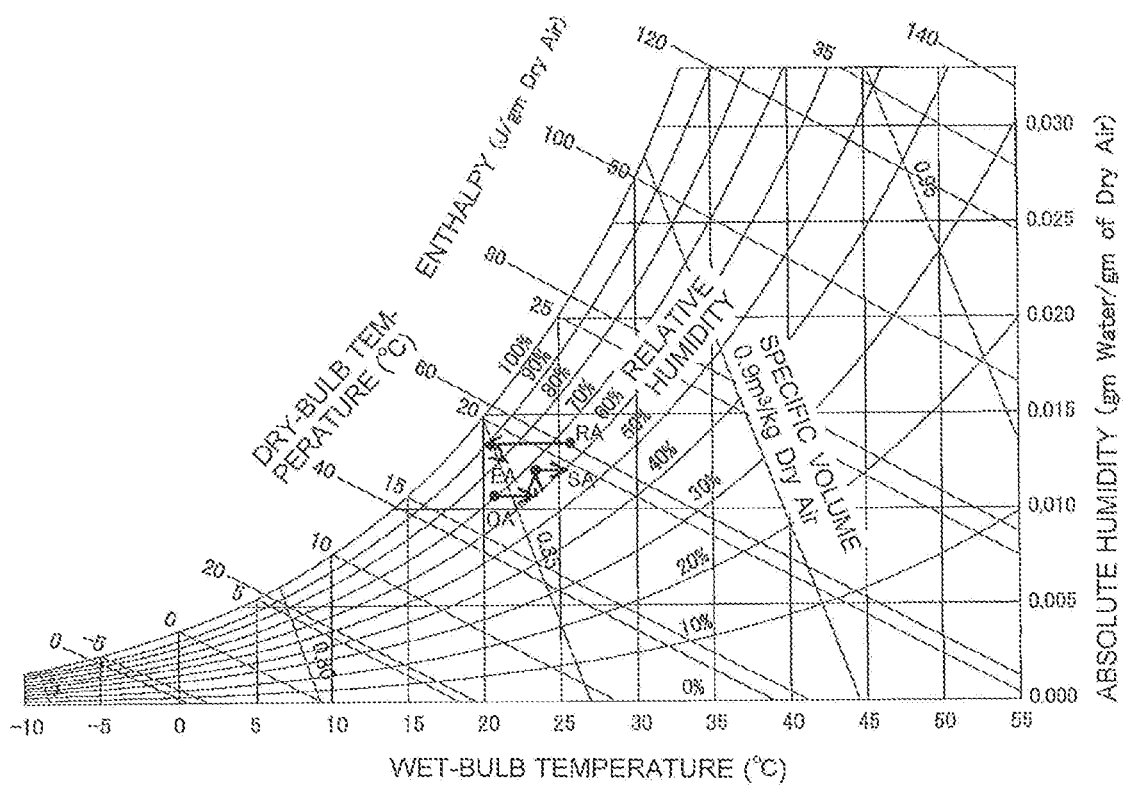
FIG. 8 is a wet air diagram according to Embodiment 1 of the present invention.

FIG. 8 is a wet air diagram according to Embodiment 1 of the present invention. Note that in FIG. 8, the horizontal axis represents a dry-bulb temperature, the vertical axis represents an absolute humidity, and the positively sloped curve represents a relative humidity. Solid arrows in FIG. 8 indicate operations of the outside air heat exchanger 7, the return air heat exchanger 8, and the supply air heat exchanger 9, respectively, and a dashed arrow indicates an operation of the total heat exchanger 2.

FIG. 8 illustrates a case where the outside air has a temperature of 21 degrees C. and a humidity of 70%, the return air has a temperature of 26 degrees C. and a humidity of 63%, and the supply air has a temperature of 24 degrees C. and a humidity of 65%.

As illustrated in FIG. 8, the amount of heat exchange in the return air heat exchanger 8 is equal to the sum of the amount of heat exchange in the outside air heat exchanger 7 and the amount of heat exchange in the supply air heat exchanger 9. The outside air is heated by the outside air heat exchanger 7 by an amount equal to the amount of remaining heat obtained after the return air is cooled by the return air heat exchanger 8, i.e., by an amount of heat obtained by subtracting the amount of heat obtained by heating the supply air from the amount of heat obtained by cooling the return air by the return air heat exchanger 8.

In the case of the refrigerant circuit B illustrated in FIG. 3B, the return air heat exchanger 8 functions as a condenser and the outside air heat exchanger 7 and the supply air heat exchanger 9 function as an evaporator. The outside air heat exchanger 7 may cool the air to the vicinity of the relative humidity of 90%, the supply air heat exchanger 9 may cool the return air temperature Tra as a target temperature, and the return air heat exchanger 8 may heat the air by an amount equal to the amount of air cooled by the outside air heat exchanger 7 and the supply air heat exchanger 9.

Figure 9:
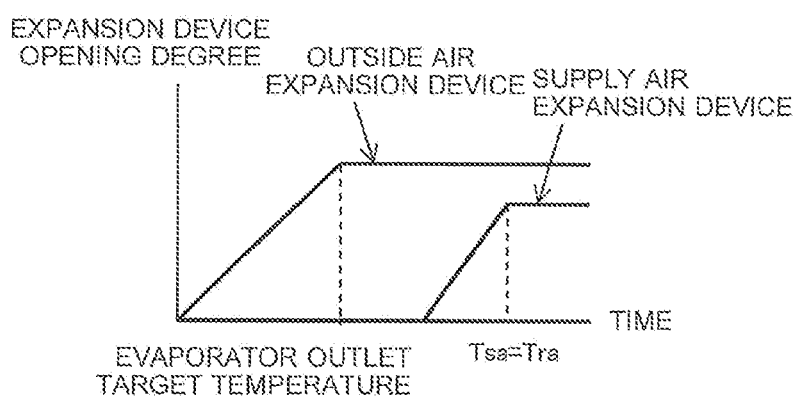
FIG. 9 is a graph illustrating opening and closing control of a supply air expansion device and an outside air expansion device in the case of the refrigerant circuit B of the ventilation device according to the embodiment of the present invention.

FIG. 9 is a graph illustrating opening and closing control of the supply air expansion device 20 and the outside air expansion device 19 in the case of the refrigerant circuit B of the ventilation device 100 according to Embodiment 1 of the present invention.

The compressor control calculation part 52d of the microcomputer unit 52 controls driving of the compressor 17 in such a manner that the evaporator outlet temperature detected by the outside air outlet temperature sensor 15, i.e., the outlet temperature of the outside air heat exchanger 7, reaches the preset evaporator outlet target temperature, and at the same time, the expansion device control calculation part 52e of the microcomputer unit 52 controls the opening degree of the outside air expansion device 19. Specifically, as illustrated in FIG. 9, the opening degree of the outside air expansion device 19 is gradually increased and when the evaporator outlet temperature reaches the evaporator outlet target temperature, the opening degree is fixed. On the other hand, the opening degree of the supply air expansion device 20 is gradually increased until the supply air temperature Tsa becomes equal to the return air temperature Tra, and when the supply air temperature Tsa becomes equal to the return air temperature Tra, the opening degree is fixed.

Figure 10:
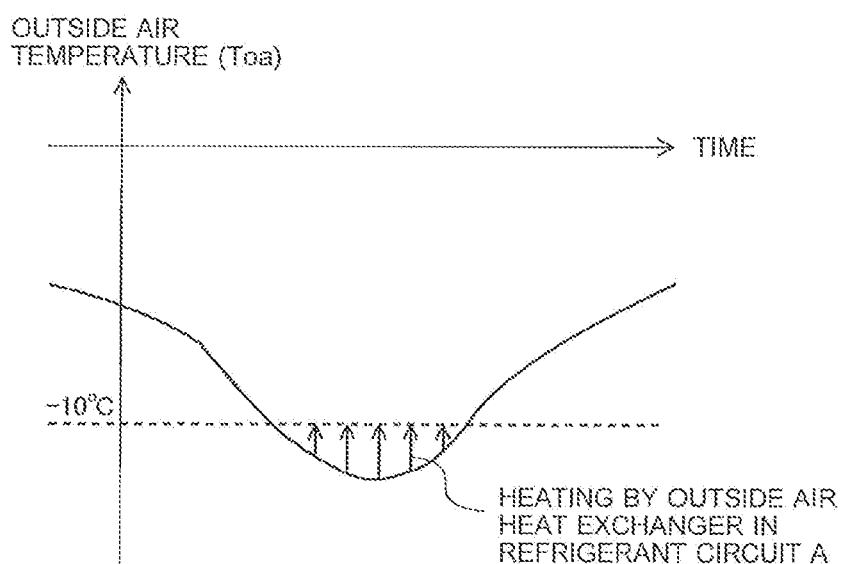
FIG. 10 is a graph illustrating control of an outside air heat exchanger when the temperature of outside air of the ventilation device according to Embodiment 1 of the present invention is extremely low.

FIG. 10 is a graph illustrating control of the outside air heat exchanger 7 when the outside air temperature of the ventilation device 100 according to Embodiment 1 of the present invention is extremely low.

As illustrated in FIG. 10 and Table 2, in a cold region or the like, the outside air temperature Toa is, for example, Toa≤−10 degrees C., which is extremely low, and when there is a possibility that the total heat exchanger 2 may be frozen, the four-way valve 18 may be switched to select the refrigerant circuit A and the outside air may be heated by the outside air heat exchanger 7 to a temperature higher than −10 degrees C., to thereby carry out an operation for protecting the total heat exchanger 2.

TABLE 2

| Outside Air Temperature | Refrigerant Circuit | Control Content |
| --- | --- | --- |
| Toa > −10 degrees C. | Continue Previous Determination | Promote Humidity Exchange |
| Toa ≤ −10 degrees C. | A | Protect Total Heat Exchanger |

Figure 11:
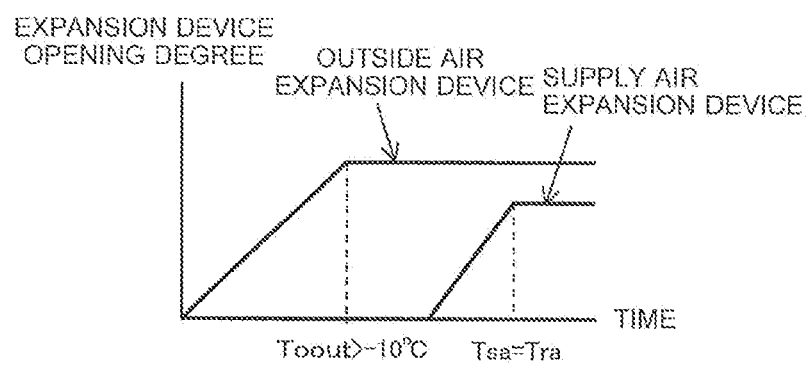
FIG. 11 is a graph illustrating opening and closing control of the supply air expansion device and the outside air expansion device when the temperature of outside air of the ventilation device according to Embodiment 1 of the present invention is extremely low.

FIG. 11 is a graph illustrating opening and closing control of the supply air expansion device 20 and the outside air expansion device 19 when the outside air temperature of the ventilation device 100 according to Embodiment 1 of the present invention is extremely low.

When the outside air temperature is equal to or less than −10 degrees C., which is the preset temperature, as illustrated in FIG. 11, the expansion device control calculation part 52e of the microcomputer unit 52 gradually increases the opening degree of the outside air expansion device 19 until an outlet temperature Toout of the outside air heat exchanger 7 becomes higher than −10 degrees C., which is the preset temperature, and when the outlet temperature Toout of the outside air heat exchanger 7 becomes higher than −10 degrees C., which is the preset temperature, the opening degree is fixed. On the other hand, the opening degree of the supply air expansion device 20 is gradually increased until the supply air temperature Tsa becomes equal to the return air temperature Tra, and when the supply air temperature Tsa becomes equal to the return air temperature Tra, the opening degree is fixed.

As described above, since the operation is performed in the direction in which the humidity exchange in the total heat exchanger 2 is promoted, as illustrated in Table 3, when AHra>AHoa, the compressor 17, the four-way valve 18, the outside air expansion device 19, and the supply air expansion device 20 are controlled in such a manner that when the return air relative humidity RHra is higher than the outside air relative humidity RHoa, RHra is set to be much higher than RHoa; when RHra is equal to RHoa, RHra is set to be higher than RHoa; and when RHra is lower than RHoa, RHra is set to be equal to RHoa.

Note that "↑" in Table 3 indicates that it is effective for promoting the humidity exchange in the total heat exchanger 2.

TABLE 3

|  | RHra > RHoa | RHra = RHoa | RHra < RHoa |
| --- | --- | --- | --- |
| AHra > AHoa | ↑ RHra >> RHoa | ↑ RHra > RHoa | ↑ RHra = RHoa |
| AHra = AHoa |  | No Humidity Transfer |  |
| AHra < AHoa | ↑ RHra = RHoa | ↑ RHra < RHoa | ↑ RHra << RHoa |

Further, since the operation is performed in the direction in which the humidity exchange in the total heat exchanger 2 is promoted, as illustrated in Table 3, when AHra<AHoa, the compressor 17, the four-way valve 18, the outside air expansion device 19, and the supply air expansion device 20 are controlled in such a manner that when RHra is higher than RHoa, RHra is set to be equal to RHoa; when RHra is equal to RHoa, RHra is set to be lower than RHoa; when RHra is lower than RHoa, RHra is set to be much lower than RHoa.

With this configuration, the operation can be performed in the direction in which the humidity exchange in the total heat exchanger 2 is promoted, except in a case where there is no humidity transfer when AHoa=AHra.

As described above, in the ventilation device 100 according to Embodiment 1, the level of the absolute humidity of the outside air is compared with the level of the absolute humidity of the return air, thereby determining the refrigerant circuit, i.e., determining which one of the refrigerant circuit A and the refrigerant circuit B is better to use, and the four-way valve 18 is switched to thereby switch the refrigerant circuit to the one that is determined to be better to use. Further, the compressor 17, the outside air expansion device 19, and the supply air expansion device 20 are controlled to improve at maximum the humidity exchange efficiency in the total heat exchanger 2, thereby controlling the relative humidity of each of the outside air and the return air.

Accordingly, the humidity exchange efficiency in the total heat exchanger 2 can be improved when the outside air receives moisture from the return air, as well as when the outside air supplies moisture to the return air.

Embodiment 2

Embodiment 2 of the present invention will be described below. The illustration of (some of) the components of Embodiments that are the same as those of Embodiment 1 is omitted, and parts of Embodiments 2 that are identical or corresponding to those of Embodiment 1 are denoted by the same reference numerals.

Figure 12:
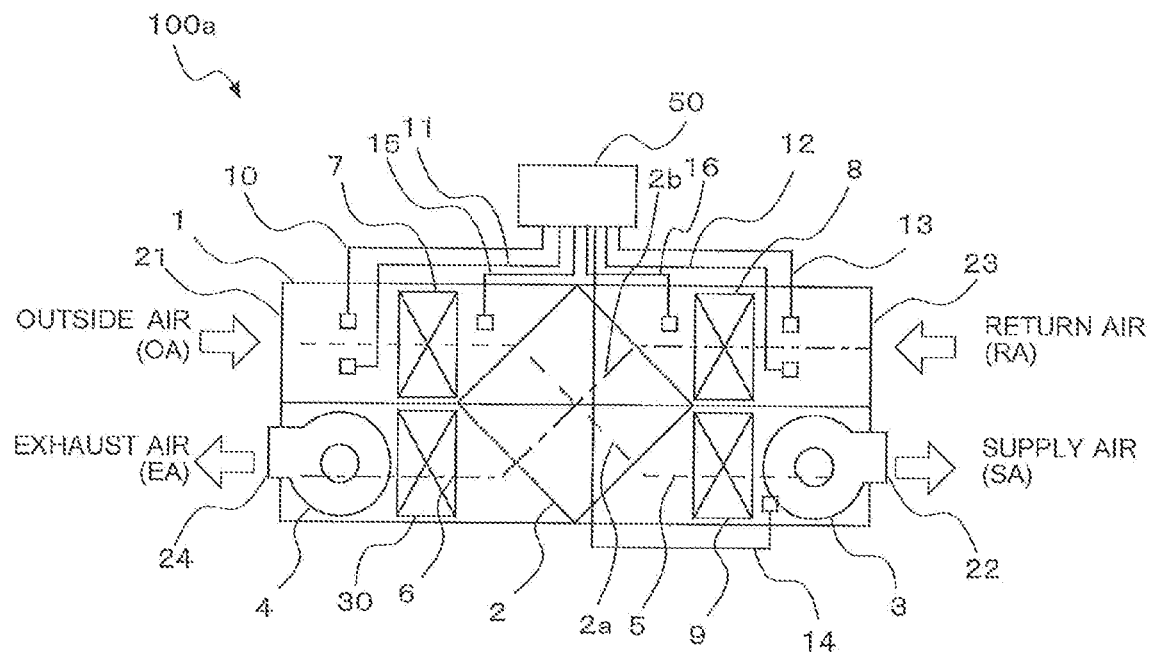
FIG. 12 is a cross-sectional view schematically illustrating a ventilation device according to Embodiment 2 of the present invention.
Figure 13:
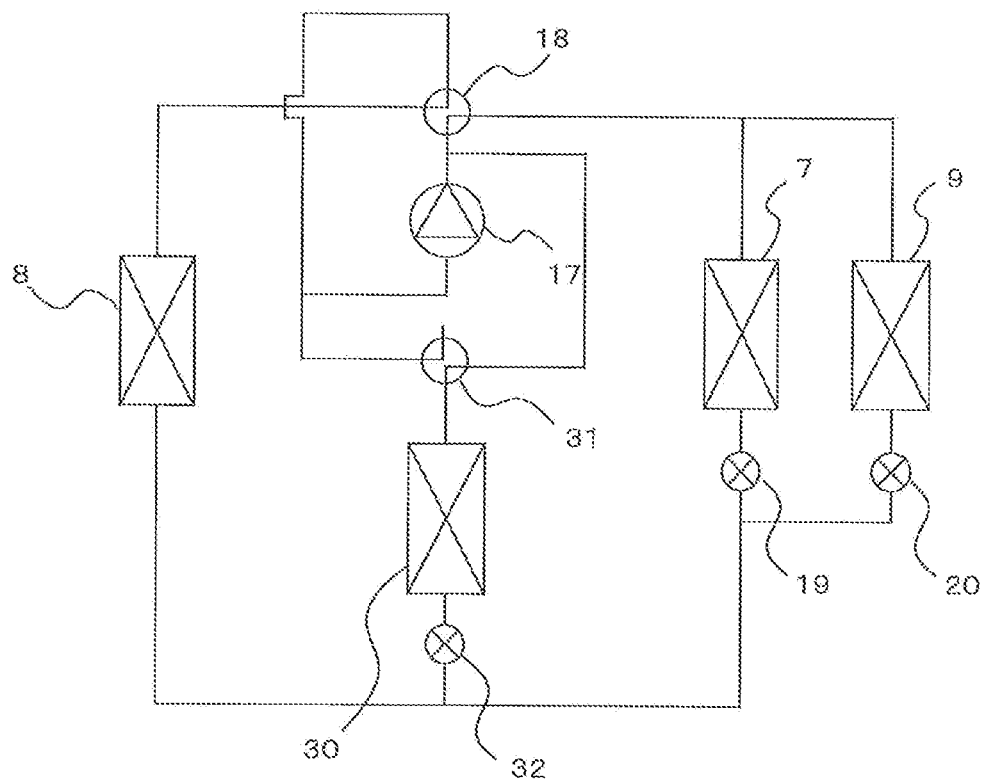
FIG. 13 illustrates a refrigerant circuit diagram illustrating a refrigerant circuit configuration in a refrigerant circuit A1 of the ventilation device according to Embodiment 2 of the present invention.
Figure 14:
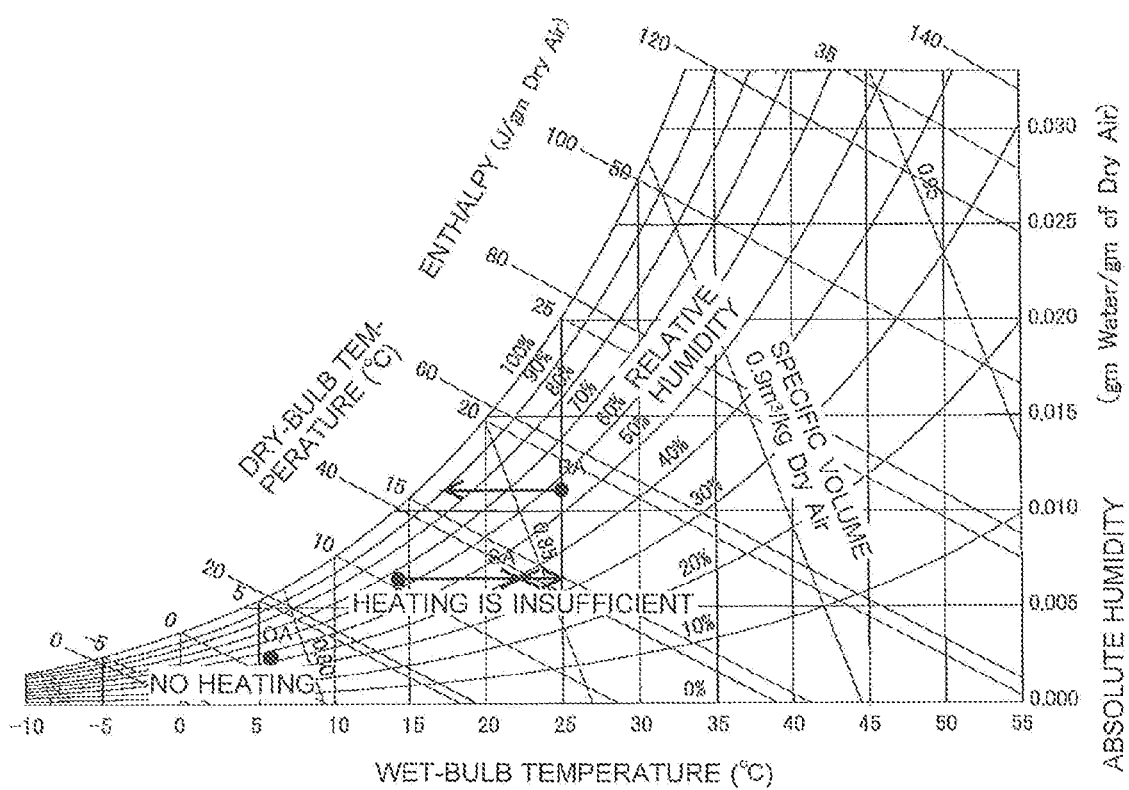
FIG. 14 is a wet air diagram according to Embodiment 2 of the present invention.

FIG. 12 is a cross-sectional view schematically illustrating a ventilation device 100a according to Embodiment 2 of the present invention. FIG. 13 illustrates a refrigerant circuit diagram illustrating a refrigerant circuit configuration in a refrigerant circuit A1 of the ventilation device 100a according to Embodiment 2 of the present invention. FIG. 14 is a wet air diagram according to Embodiment 2 of the present invention. Note that in FIG. 14, the horizontal axis represents a dry-bulb temperature, the vertical axis represents an absolute humidity, and the positively sloped curve represents a relative humidity. Solid arrows in FIG. 14 indicate operations of the return air heat exchanger 8 and the supply air heat exchanger 9, respectively.

In the ventilation device 100a according to Embodiment 2, as illustrated in FIG. 12, an exhaust heat exchanger 30 is disposed on the exhaust air path 6 at the downstream side of the exhaust air passage 2b of the total heat exchanger 2, specifically, on the exhaust air path 6 between the total heat exchanger 2 and the exhaust air port 24. As illustrated in FIG. 13, a four-way valve 31 is provided in addition to the four-way valve 18, and the exhaust heat exchanger 30 and an exhaust air expansion device 32 which are connected in series by pipes are connected in parallel to the return air heat exchanger 8 by pipes. Note that the other components are similar to those of the ventilation device 100 according to Embodiment 1.

When AHra−AHoa>0, the microcomputer unit 52 switches the four-way valves 18 and 31 to select the refrigerant circuit A1 illustrated in FIG. 13. At this time, the return air heat exchanger 8 functions as an evaporator, and the outside air heat exchanger 7, the supply air heat exchanger 9, and the exhaust heat exchanger 30 functions as a condenser.

In a temperature environment as illustrated in FIG. 14, it is difficult to balance the amount of heat exchange. Accordingly, in the case of the refrigerant circuit A1, when the outside air temperature is equal to or less than the preset temperature and the outside air humidity is equal to or less than the preset humidity, and when the supply air temperature Tsa<the return air temperature Tra, even if the opening degree of the supply air expansion device 20 is controlled until the supply air temperature Tsa becomes equal to the return air temperature Tra as in Embodiment 1, the amount of heat exchange in the supply air heat exchanger 9 is insufficient, which makes it difficult to set the supply air temperature Tsa to be equal to the return air temperature Tra.

Accordingly, in Embodiment 2, not only the opening degree of the supply air expansion device 20, but also the opening degree of the exhaust air expansion device 32 is controlled until the supply air temperature Tsa becomes equal to the return air temperature Tra. With this configuration, when it is difficult to balance the amount of heat exchange as illustrated in FIG. 14, an insufficient amount of heat exchange in the supply air heat exchanger 9 can be supplemented with the amount of heat exchange in the exhaust heat exchanger 30, which makes it possible to more easily set the supply air temperature Tsa to be equal to the return air temperature Tra than in Embodiment 1.

REFERENCE SIGNS LIST 1 casing 2 total heat exchanger 2a supply air passage 2b exhaust air passage 3 supply air fan 4 exhaust air fan 5 supply air path 6 exhaust air path 7 outside air heat exchanger 8 return air heat exchanger 9 supply air heat exchanger 10 outside air temperature sensor 11 outside air humidity sensor 12 return air temperature sensor 13 return air humidity sensor 14 supply air temperature sensor 15 outside air outlet temperature sensor 16 return air outlet temperature sensor 17 compressor 18 four-way valve 19 outside air expansion device 20 supply air expansion device 21 outside air port 22 supply air port 23 return air port 24 exhaust air port 30 exhaust heat exchanger 31 four-way valve 32 exhaust air expansion device 50 controller 51 sensor input detection unit 52 microcomputer unit 52a absolute humidity calculation part 52b refrigerant circuit determination part 52c evaporator outlet target temperature calculation part 52d compressor control calculation part 52e expansion device control calculation part 52f blowout temperature control part 53 storage unit 53a refrigerant circuit determination data 100 ventilation device 100a ventilation device.

The invention claimed is:

1. A ventilation device including a casing, an inside of the casing being provided with:
   a supply air fan configured to suction outdoor air from an outside air port;
   an exhaust air fan configured to suction indoor air from a return air port;
   a total heat exchanger including a supply air passage and an exhaust air passage and configured to exchange heat between the outdoor air passing through the supply air passage and the indoor air passing through the exhaust air passage;
   a supply air path through which the outdoor air suctioned by the supply air fan passes when the outside air passes through the supply air passage and is supplied into a room from a supply air port; and
   an exhaust air path through which the indoor air suctioned by the exhaust air fan passes when the indoor air passes through the exhaust air passage and is discharged to an outside of the room from an exhaust air port,
   the ventilation device comprising:
      an outside air heat exchanger disposed between the total heat exchanger and the outside air port;
      a return air heat exchanger disposed between the total heat exchanger and the return air port; and
      a supply air heat exchanger disposed between the total heat exchanger and the supply air port,
   a compressor, a flow switching valve, the outside air heat exchanger, an outside air expansion valve, and the return air heat exchanger being sequentially connected by pipes, the supply air heat exchanger and a supply air expansion valve being connected in parallel to the outside air heat exchanger and the outside air expansion valve by pipes to form a refrigerant circuit in which refrigerant is circulated, the supply air heat exchanger and the supply air expansion valve being connected in series by pipes;
   a controller;
   an outside air temperature sensor disposed between the outside air heat exchanger and the outside air port, and configured to detect an outside air temperature, and output the outside air temperature to the controller;
   an outside air humidity sensor disposed between the outside air heat exchanger and the outside air port, and configured to detect an outside air humidity, and output the outside air humidity to the controller;
   a return air temperature sensor disposed between the return air heat exchanger and the return air port, and configured to detect a return air temperature, and output the return air temperature to the controller; and
   a return air humidity sensor disposed between the return air heat exchanger and the return air port, and configured to detect a return air humidity, and outputs the return air humidity to the controller,
   wherein, when a return air absolute humidity calculated from detected values of the return air temperature sensor and the return air humidity sensor is higher than an outside air absolute humidity calculated from detected values of the outside air temperature sensor and the outside air humidity sensor, the controller is configured to switch the flow switching valve in such a manner that the return air heat exchanger functions as an evaporator and the outside air heat exchanger and the supply air heat exchanger function as a condenser, and
   wherein, when the return air absolute humidity is lower than the outside air absolute humidity, the controller is configured to switch the flow switching valve in such a manner that the return air heat exchanger functions as a condenser and the outside air heat exchanger and the supply air heat exchanger function as an evaporator.

2. The ventilation device according to claim 1, further comprising a return air outlet temperature sensor disposed between the return air heat exchanger and the total heat exchanger, and configured to detect an outlet temperature of the return air heat exchanger, and output the outlet temperature to the controller,
wherein, when the return air absolute humidity is higher than the outside air absolute humidity, the controller is configured to control driving of the compressor and an opening degree of the outside air expansion valve in such a manner that the outlet temperature of the return air heat exchanger becomes equal to a preset target temperature.

3. The ventilation device according to claim 1, further comprising:
a return air outlet temperature sensor disposed between the return air heat exchanger and the total heat exchanger, configured to detect an outlet temperature of the return air heat exchanger, and output the outlet temperature to the controller; and
a supply air temperature sensor disposed between the supply air heat exchanger and the supply air port, configured to detect a supply air temperature, and output the supply air temperature to the controller,
wherein, when the return air absolute humidity is higher than the outside air absolute humidity and when the outside air temperature is equal to or less than a preset temperature and the outside air humidity is equal to or less than a preset humidity, the controller is configured to control an opening degree of the supply air expansion valve in such a manner that the supply air temperature becomes equal to the return air temperature when the supply air temperature is lower than the return air temperature, and fix the opening degree of the supply air expansion valve when the supply air temperature becomes equal to the return air temperature, and
wherein the controller is configured to control driving of the compressor and an opening degree of the outside air expansion valve in such a manner that the outlet temperature of the return air heat exchanger reaches a preset target temperature.

4. The ventilation device according to claim 1, further comprising:
an outside air outlet temperature sensor disposed between the outside air heat exchanger and the total heat exchanger, and configured to detect an outlet temperature of the outside air heat exchanger, and output the outlet temperature to the controller; and
a supply air temperature sensor disposed between the supply air heat exchanger and the supply air port, configured to detect a supply air temperature, and output the supply air temperature to the controller,
wherein, when the return air absolute humidity is lower than the outside air absolute humidity, the controller is configured to control driving of the compressor and the opening degree of the outside air expansion valve in such a manner that the outlet temperature of the outside air heat exchanger reaches a preset target temperature, and, when the outlet temperature reaches the target temperature, the controller is configured to fix the opening degree of the outside air expansion valve, control the opening degree of the supply air expansion valve in such a manner that the supply air temperature becomes equal to the return air temperature, and fix the opening degree of the supply air expansion valve when the supply air temperature becomes equal to the return air temperature.

5. The ventilation device according to claim 3, further comprising an exhaust heat exchanger disposed between the total heat exchanger and the exhaust air port,
wherein the refrigerant circuit is formed by connecting the exhaust heat exchanger and an exhaust air expansion valve in parallel to the return air heat exchanger by pipes, the exhaust heat exchanger and the exhaust air expansion valve being connected in series by pipes, and
wherein, when the return air absolute humidity is higher than the outside air absolute humidity, and when the outside air temperature is lower than a preset temperature and the outside air humidity is equal to or less than a preset humidity, the controller is configured to control the opening degree of the supply air expansion valve and the opening degree of the exhaust air expansion valve in such a manner that the supply air temperature becomes equal to the return air temperature when the supply air temperature is lower than the return air temperature.

6. A ventilation device including a casing, an inside of the casing being provided with:
a supply air fan configured to suction outdoor air from an outside air port;
an exhaust air fan configured to suction indoor air from a return air port;
a total heat exchanger including a supply air passage and an exhaust air passage and configured to exchange heat between the outdoor air passing through the supply air passage and the indoor air passing through the exhaust air passage;
a supply air path through which the outdoor air suctioned by the supply air fan passes when the outside air passes through the supply air passage and is supplied into a room from a supply air port; and
an exhaust air path through which the indoor air suctioned by the exhaust air fan passes when the indoor air passes through the exhaust air passage and is discharged to an outside of the room from an exhaust air port,
the ventilation device comprising:
an outside air heat exchanger disposed between the total heat exchanger and the outside air port;
a return air heat exchanger disposed between the total heat exchanger and the return air port; and
a supply air heat exchanger disposed between the total heat exchanger and the supply air port,
a compressor, a flow switching valve, the outside air heat exchanger, an outside air expansion valve, and the return air heat exchanger being sequentially connected by pipes, the supply air heat exchanger and a supply air expansion valve being connected in parallel to the outside air heat exchanger and the outside air expansion valve by pipes to form a refrigerant circuit in which refrigerant is circulated, the supply air heat exchanger and the supply air expansion valve being connected in series by pipes;
a controller;
an outside air temperature sensor disposed between the outside air heat exchanger and the outside air port, and configured to detect an outside air temperature, and output the outside air temperature to the controller;
an outside air outlet temperature sensor disposed between the outside air heat exchanger and the total heat exchanger, configured to detect an outlet temperature of the outside air heat exchanger, and output the outlet temperature to the controller;

a supply air temperature sensor disposed between the supply air heat exchanger and the supply air port, configured to detect a supply air temperature, and output the supply air temperature to the controller; and a return air temperature sensor disposed between the return air heat exchanger and the return air port, configured to detect a return air temperature, and output the return air temperature to the controller, wherein, when the outside air temperature is equal to or less than a preset temperature, the controller is configured to switch the flow switching valve in such a manner that the return air heat exchanger functions as an evaporator and the outside air heat exchanger and the supply air heat exchanger function as a condenser, the controller is configured to control an opening degree of the outside air expansion valve until the outlet temperature of the outside air heat exchanger becomes higher than a preset temperature, when the outlet temperature of the outside air heat exchanger becomes higher than the preset temperature, the controller is configured to fix the opening degree of the outside air expansion valve and control the opening degree of the supply air expansion valve until the supply air temperature becomes equal to the return air temperature, and when the supply air temperature becomes equal to the return air temperature, the controller is configured to fix the opening degree of the supply air expansion valve.

* * * * *